United States Patent
Hu et al.

(10) Patent No.: US 11,973,707 B2
(45) Date of Patent: Apr. 30, 2024

(54) DISTRIBUTED-TONE RESOURCE UNIT OPERATION IN 6GHZ LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 140 days.

(21) Appl. No.: 17/521,918

(22) Filed: Nov. 9, 2021

(65) Prior Publication Data

US 2022/0150009 A1    May 12, 2022

Related U.S. Application Data

(60) Provisional application No. 63/112,660, filed on Nov. 12, 2020.

(51) Int. Cl.
*H04L 5/00*    (2006.01)

(52) U.S. Cl.
CPC .......... *H04L 5/0046* (2013.01); *H04L 5/0048* (2013.01); *H04L 5/0064* (2013.01)

(58) Field of Classification Search
None
See application file for complete search history.

(56) References Cited

U.S. PATENT DOCUMENTS

| | | | |
|---|---|---|---|
| 2010/0284482 A1 | 11/2010 | Cudak et al. | |
| 2019/0045548 A1 | 2/2019 | Zhang et al. | |
| 2020/0014509 A1* | 1/2020 | Asterjadhi | ............ H04L 5/0041 |

FOREIGN PATENT DOCUMENTS

| | | | | |
|---|---|---|---|---|
| CN | 102422694 A | | 4/2012 | |
| EP | 3923530 A1 | | 12/2021 | |
| EP | 3945693 A1 | * | 2/2022 | ....... H04L 27/26025 |
| EP | 3945693 A1 | | 2/2022 | |
| TW | I698152 B | | 7/2020 | |

OTHER PUBLICATIONS

European Patent Office, Extended European Search Report and Opinion for European Patent Application No. 21207801.8, dated Apr. 7, 2022.

(Continued)

*Primary Examiner* — Yemane Mesfin
*Assistant Examiner* — Jeff Banthrongsack
(74) *Attorney, Agent, or Firm* — Han IP PLLC; Andy M. Han

(57) ABSTRACT

Various schemes pertaining to distributed-tone resource unit (RU) operation in 6 GHz low-power indoor (LPI) systems are described. A communication entity distributes frequency tones of a resource unit (RU) over a distribution bandwidth as a distributed-tone RU (dRU). The communication entity then communicates using the distributed-tone RU in a 6 GHz low-power indoor (LPI) system. In some cases, the dRU is distributed over an entire bandwidth. Alternatively, the dRU operation is implemented per frequency segment. Alternatively, the dRU co-exists with regular or localized RU.

13 Claims, 8 Drawing Sheets

(56) References Cited

OTHER PUBLICATIONS

Edward Au (Huawei): "Specification Framework for TGbe", IEEE Draft; 11-19-1262-14-00BE-Specification-Framework-for-TGBE, IEEE-SA Mentor, Piscataway, NJ USA, vol. 802.11 EHT; 802.11be, No. 14, Sep. 5, 2020, pp. 1-58, XP068172484.
Taiwan Intellectual Property Office, Office Action for Taiwan Patent Application No. 110141949, dated Sep. 30, 2022.

\* cited by examiner

DISTRIBUTED-TONE RESOURCE UNIT OPERATION IN 6GHZ LOW-POWER INDOOR SYSTEMS

CROSS REFERENCE TO RELATED PATENT APPLICATION

The present disclosure is part of a non-provisional patent application claiming the priority benefit of U.S. Provisional Patent Application No. 63/112,660, filed 12 Nov. 2020, the content of which being incorporated by reference in its entirety.

TECHNICAL FIELD

The present disclosure is generally related to wireless communications and, more particularly, to distributed-tone resource unit (dRU) operation in 6 GHz low-power indoor (LPI) systems.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4-GHz and 5-GHz bands, the equivalent isotropically radiated power (EIRP) of a power spectral density (PSD) limit is capped at 20 dBm for 2-MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6-GHz low-power indoor (LPI) applications is far more stringent than PSD requirement regarding the 2.4-GHz and 5-GHz bands. For instance, the EIRP limit is at 5 dBm/MHz for an access point (AP) in 6-GHz LPI versus the EIRP limit of 17 dBm/MHz for APs in the 5-GHz band. Similarly, the EIRP limit is at −1 dBm/MHz for an non-AP in 6-GHz LPI versus the EIRP limit of 11 dBm/MHz for APs in the 5-GHz band. Accordingly, distributed-tone RU (herein interchangeably referred to as "dRU", "interleaved-tone RU" and "iRU") can be a spectral-efficient solution to boost the transmit power and improve coverage range for LPI in 6 GHz., design methods have been proposed intending to increase the Tx power and improve the coverage range for 6 GHz LPI systems. However, as specifics on implementation of distributed-tone RU operation have yet to be defined, there is a need for a solution for distributed-tone RU operation in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to distributed-tone RU operation in 6 GHz LPI systems. Under various proposed schemes in accordance with the present disclosure, there may be several modes and/or scenarios for distributed-tone RU (dRU) operation in 6 GHz LPI systems. For instance, under some of the proposed schemes, a dRU may be distributed over an entire distribution bandwidth, dRU operation may be implemented per frequency subblock or segment, dRU may be operated in a scenario of one frequency subblock being punctured and dRUs being distributed on other non-punctured frequency subblocks, or dRU may co-exist with regular RU (or localized RU). Under other proposed schemes, dRU may be distributed over part of a bandwidth for some stations (STAs) and over an entire bandwidth for some other STAs. Moreover, a dRU may be implemented with frequency resource duplication.

In one aspect, a method may involve distributing frequency tones of a RU over a distribution bandwidth as a dRU. The method may also involve communicating using the dRU in a 6 GHz LPI system.

In another aspect, an apparatus may include a transceiver configured to communicate wirelessly and a processor coupled to the transceiver. The processor may distribute frequency tones of a RU over a distribution bandwidth as a dRU. The processor may also communicate, via the transceiver, using the dRU in a 6 GHz LPI system.

It is noteworthy that, although description provided herein may be in the context of certain radio access technologies, networks and network topologies such as Wi-Fi and wireless local area network (WLAN) under pertinent Institute of Electrical and Electronics Engineers (IEEE) 802.11 standards, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Figure 1:
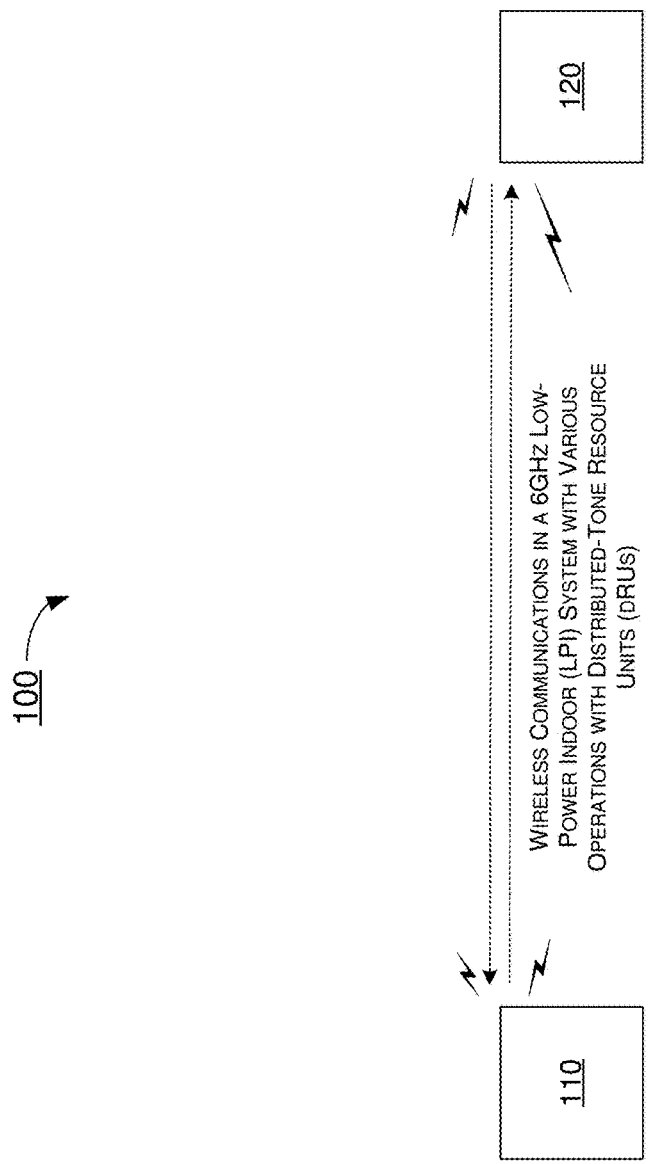
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to distributed-tone RU (dRU) operation in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26, a 52-tone regular RU may be interchangeably denoted as RU52, a 106-tone regular RU may be interchangeably denoted as RU106, a 242-tone regular RU may be interchangeably denoted as RU242, and so on. Moreover, an aggregate (26+52)-tone regular MRU may be interchangeably denoted as MRU78, an aggregate (26+106)-tone regular MRU may be interchangeably denoted as MRU132, and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA (herein interchangeably denoted as "STA1") and communication entity 120 may be a second STA (herein interchangeably denoted as "STA2"), with each of the first STA and second STA functioning an access point (AP) STA or a non-AP STA. Under various proposed schemes in accordance with the present disclosure, communication entity 110 and communication entity 120 may be configured to communicate wirelessly with distributed-tone RU operation in 6 GHz LPI systems, as described herein.

Figure 2:
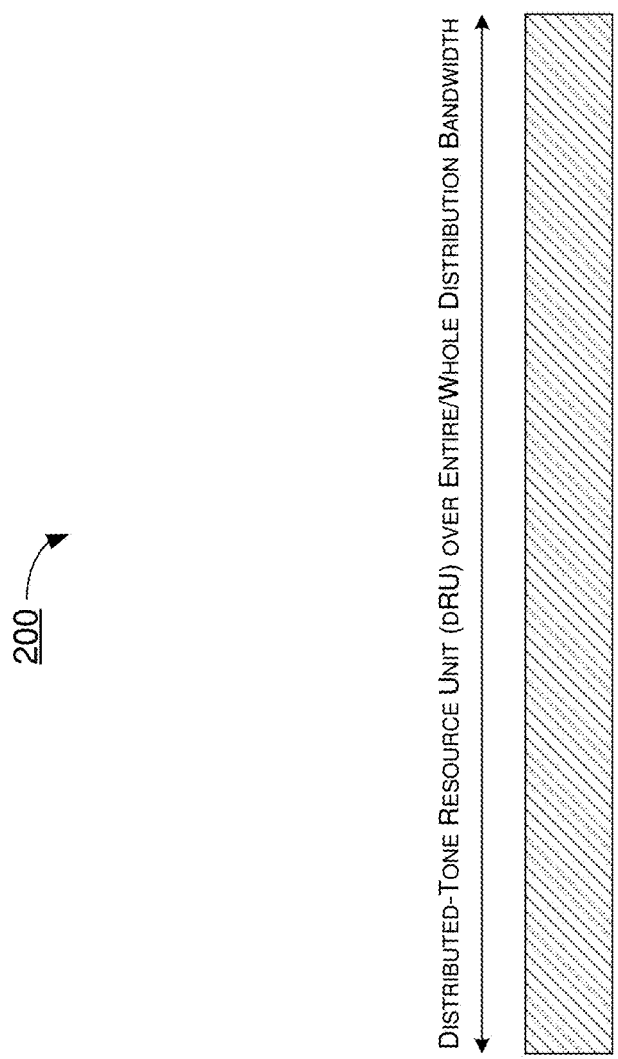
FIG. 2 is a diagram of an example scenario in accordance with an implementation of the present disclosure.

Under a first proposed scheme in accordance with the present disclosure, a given distributed-tone RU (dRU) may be distributed over an entire distribution bandwidth for 6 GHz LPI operations. FIG. 2 illustrates an example scenario 200 under the proposed scheme. Referring to FIG. 2, under the proposed scheme, all STAs may be scheduled or otherwise assigned with a dRU over the same or an entirety of a distribution bandwidth. The dRU may be scheduled with different RU size and index for each STA (e.g., STA1 and STA2). The distribution bandwidth (or distribution window) may be 20 MHz, 40 MHz, 80 MHz and/or greater. Alternatively, the distribution bandwidth (or distribution window) may be limited to a certain bandwidth (e.g., up to 80 MHz, up to 160 MHz or up to 320 MHz).

Figure 3:
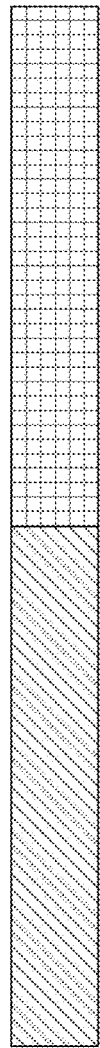
FIG. 3 is a diagram of an example scenario in accordance with an implementation of the present disclosure.
Figure 3:
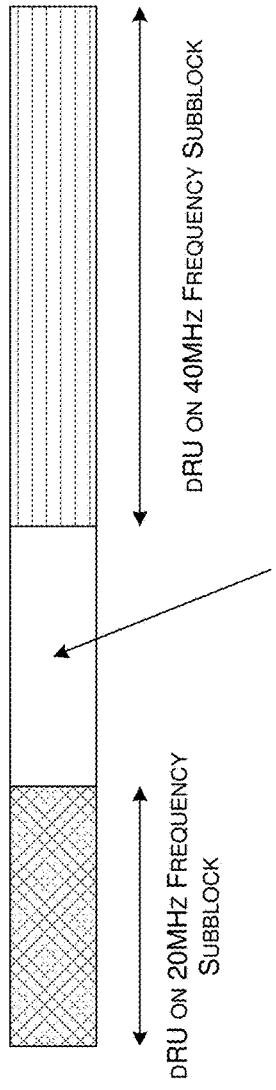

Under a second proposed scheme in accordance with the present disclosure, a dRU operation may be implemented per frequency subblock or segment for 6 GHz LPI operations. FIG. 3 illustrates an example scenario 300 under the proposed scheme. Under the proposed scheme, dRU tone distributions may be performed per frequency subblock (e.g., per-20 MHz, per-40 MHz or per-80 MHz frequency segment). Under the proposed scheme, tone distribution may not cross a boundary between any two adjacent frequency subblocks. In an event that a user or STA is scheduled with a dRU, such dRU may be scheduled within one frequency subblock and not more than one frequency subblock. The size of a distribution bandwidth may be either the same or different for each STA in a given basic service set (BSS) for 6 GHz LPI operations. Part (A) of FIG. 3 shows an example of dRU per-80 MHz subblock for an operational bandwidth of 160 MHz. Part (B) of FIG. 3 shows an example of dRU operated in a scenario of one frequency subblock (e.g. 20 MHz) being punctured and dRUs being distributed on other non-punctured frequency subblocks (e.g. 20 MHz and 40 MHz frequency subblocks) for an operational bandwidth of 80 MHz or an 80 MHz frequency subblock.

Figure 4:
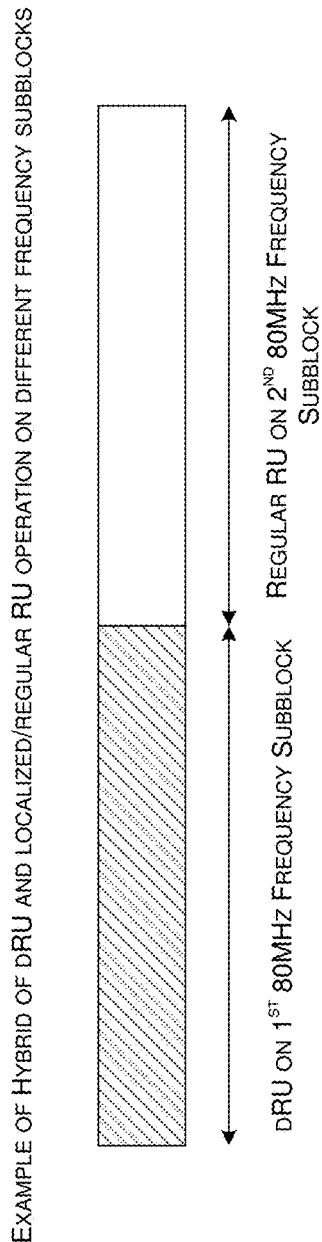
FIG. 4 is a diagram of an example scenario in accordance with an implementation of the present disclosure.

Under a third proposed scheme in accordance with the present disclosure, a dRU may co-exist with regular RU (or localized RU) for 6 GHz LPI operations. FIG. 4 illustrates an example scenario 400 under the proposed scheme. Referring to FIG. 4, under the proposed scheme, there may be a hybrid mode of operation with distributed-tone RU and localized/regular RU on different (and non-overlapping) frequency subblocks or segments (e.g., each being an 80 MHz frequency segment when the operational bandwidth is 160 MHz or 320 MHz). As IEEE 802.11be supports aggregate physical-layer protocol data units (A-PPDUs), under the proposed scheme, each 80 MHz frequency subblock or segment may transmit independent IEEE 802.11be PPDUs or PPDUs of different generations (e.g., PPDUs per specifications of IEEE 802.11ax and IEEE 802.11be). Moreover, as a distance of each user or STA to an AP may be different, a far-away STA may need to boost its transmit power by dRU, while a nearby STA (or a STA scheduled with a larger RU or STAs scheduled with multi-user multiple-input-multiple-output (MU-MIMO)) may merely need to transmit with a regular RU. Thus, under the proposed scheme, dRU operation may co-exist with regular RU (e.g., a RU as specified under IEEE 802.11be or IEEE 802.11ax) on different (and non-overlapping) frequency subblocks or segments (e.g., 80 MHz frequency subblocks or frequency segments of a different size). This hybrid mode may also allow dRU for LPI in one 6 GHz frequency resource subblock or segment and Automated Frequency Control (AFC) operated in another 6 GHz band frequency segment with regular RU.

Figure 5:
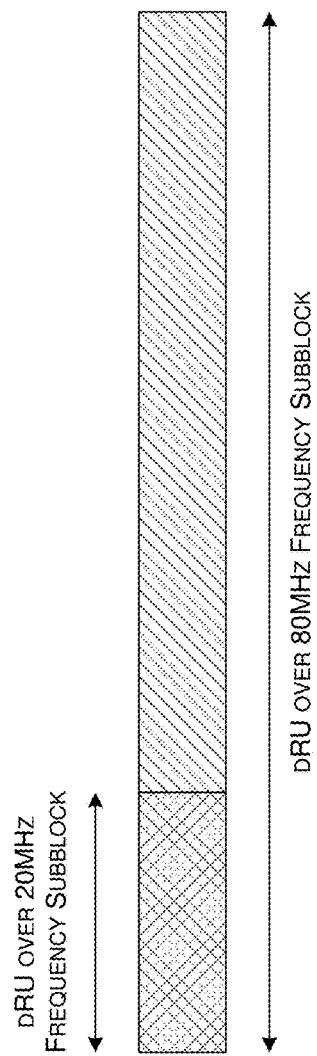
FIG. 5 is a diagram of an example scenario in accordance with an implementation of the present disclosure.

Under a fourth proposed scheme in accordance with the present disclosure, a dRU may be distributed over a partial bandwidth for some STAs and over an entire bandwidth for some other STAs for 6 GHz LPI operations. FIG. 5 illustrates an example scenario 500 under the proposed scheme. As IEEE 802.11be can support different applications, some devices on 6 GHz LPI may prefer to transmit in a narrow bandwidth (e.g., 20 MHz) with a smaller RU for applications with lower data rate, while some other devices may need to transmit data over a wider bandwidth with a larger RU. Thus, under the proposed scheme, one or more dRUs may be distributed over a portion of an operational bandwidth (not its entirety) for certain STAs, while one or more other dRUs may be distributed over the entirety of the operational bandwidth for some other STAs.

Figure 6:
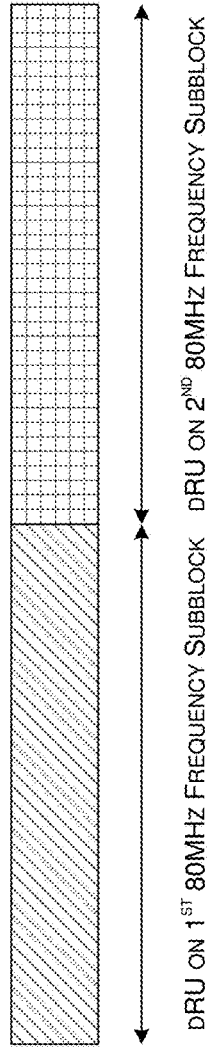
FIG. 6 is a diagram of an example scenario in accordance with an implementation of the present disclosure.

Under a fifth proposed scheme in accordance with the present disclosure, a dRU may be implemented with frequency resource duplication for 6 GHz LPI operations. FIG. 6 illustrates an example scenario 600 under the proposed scheme. Under the proposed scheme, coverage enhancement for 6 GHz LPI may be achieved through either boosting of transmission power by spreading tones over a larger bandwidth or by maximal ratio combining (MRC) combination at a receiver by duplicating the transmission. Distribution gain may be saturated for RUs of a certain size distributed over a sufficiently large bandwidth. For instance, dRU26 may achieve a full distribution gain by spreading tones over a BW40 (or RU484), but dRU26 would not improve transmit power further by distributing a RU26 over a wider bandwidth (e.g., greater than BW40), while dRU52 may achieve a full distribution gain over a BW80 (or RU996), and so on. In addition, for dRU per frequency subblock operation, frequency resource duplication may further improve the coverage range by performing duplication with dRU together. Part (A) of FIG. 6 shows an example of dRU on per-80 MHz frequency subblock plus duplication for BW160. Part (B) of FIG. 6 shows an example of one user with dRU plus duplication and another user with dRU over an entire distribution bandwidth.

Illustrative Implementations

Figure 7:
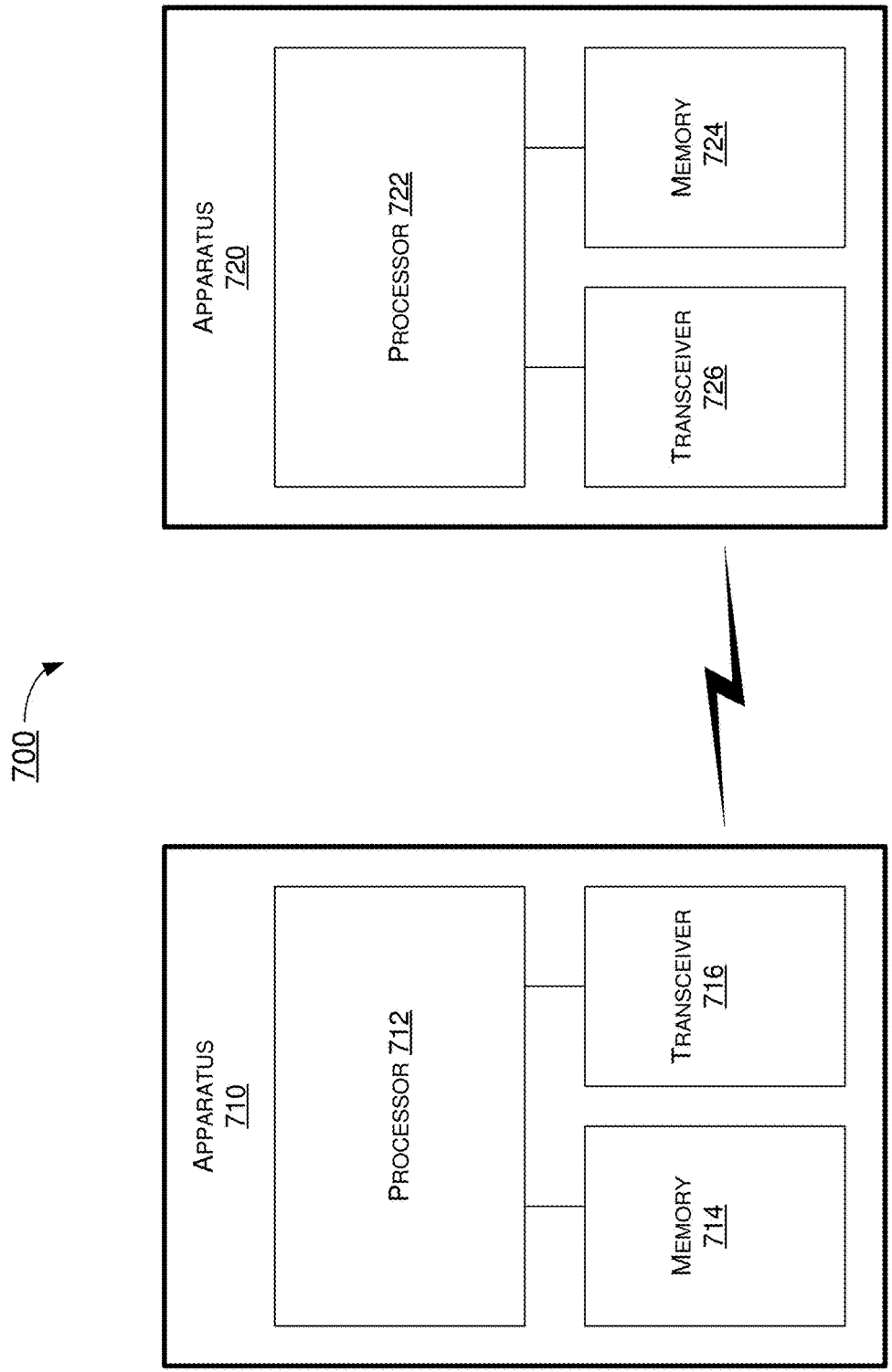
FIG. 7 is a block diagram of an example communication system in accordance with an implementation of the present disclosure.

FIG. 7 illustrates an example system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to distributed-tone RU operation in 6 GHz LPI systems, including the various schemes described above with respect to various proposed designs, concepts, schemes, systems and methods described above as well as processes described below. For instance, apparatus 710 may be an example implementation of communication entity 110, and apparatus 720 may be an example implementation of communication entity 120.

Each of apparatus 710 and apparatus 720 may be a part of an electronic apparatus, which may be a STA or an AP, such as a portable or mobile apparatus, a wearable apparatus, a wireless communication apparatus or a computing apparatus. For instance, each of apparatus 710 and apparatus 720 may be implemented in a smartphone, a smart watch, a personal digital assistant, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in a network node, such as an AP in a WLAN.

In some implementations, each of apparatus 710 and apparatus 720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 710 and apparatus 720 may be implemented in or as a STA or an AP. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, one or more RISC processors or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to distributed-tone RU operation in 6 GHz LPI systems in accordance with various implementations of the present disclosure. For instance, each of processor 712 and processor 722 may be configured with hardware components, or circuitry, implementing one, some or all of the examples described and illustrated herein.

In some implementations, apparatus 710 may also include a transceiver 716 coupled to processor 712. Transceiver 716 may be capable of wirelessly transmitting and receiving data. In some implementations, apparatus 720 may also include a transceiver 726 coupled to processor 722. Transceiver 726 may include a transceiver capable of wirelessly transmitting and receiving data.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as communication entity 110, and apparatus 720, as communication entity 120, is provided below. It is noteworthy that, although the example implementations described below are provided in the context of WLAN, the same may be implemented in other types of networks. Thus, although the following description of example implementations pertains to a scenario in which apparatus 710 functions as a transmitting device and apparatus 720 functions as a receiving device, the same is also applicable to another scenario in which apparatus 710 functions as a receiving device and apparatus 720 functions as a transmitting device.

Under a proposed scheme in accordance with the present disclosure with respect to distributed-tone RU operation in 6 GHz LPI systems, processor 712 of apparatus 710 may distribute frequency tones of a RU over a distribution bandwidth as a dRU. Additionally, processor 712 may communicate, via transceiver 716, with apparatus 720 using the dRU in a 6 GHz LPI system.

In some implementations, in distributing the frequency tones of the RU, processor 712 may distribute the frequency tones of the RU over an entirety of the distribution bandwidth. In some implementations, the distribution bandwidth may include a 20 MHz, 40 MHz or 80 MHz bandwidth. Alternatively, or additionally, the distribution bandwidth may include a bandwidth up to 80 MHz, 160 MHz or 320 MHz.

In some implementations, in distributing the frequency tones of the RU, processor 712 may distribute the frequency tones of the RU per frequency subblock. In some implementations, the frequency subblock may include a 20 MHz, 40 MHz or 80 MHz frequency subblock. Moreover, the distributed-tone RU may not cross a boundary between two adjacent frequency subblocks.

In some implementations, in distributing the frequency tones of the RU, processor 712 may distribute the frequency tones of the RU such that the distributed-tone RU is over a first frequency subblock. In such cases, in communicating, processor 712 may communicate using both the distributed-tone RU over the first frequency subblock and a localized RU over a second frequency subblock different from the first frequency subblock. In some implementations, each of the first frequency subblock and the second frequency subblock may include an 80 MHz frequency subblock. Alternatively, or additionally, in communicating, processor 712 may communicate in an operational bandwidth of 160 MHz or 320 MHz.

In some implementation, dRU may be operated in a scenario in which one frequency subblock (e.g., 20 MHz) within an 80 MHz bandwidth is punctured and dRUs are distributed on other non-punctured frequency subblocks. The non-punctured frequency subblocks may include 20 MHz and 40 MHz frequency subblocks within the 80 MHz distribution bandwidth or an 80 MHz frequency subblock.

In some implementations, in distributing the frequency tones of the RU, processor 712 may distribute the frequency tones of the RU over a portion but not an entirety of an operational bandwidth. In such cases, in communicating, processor 712 may communicate using the distributed-tone RU over the portion of the operational bandwidth while another STA communicates over the entirety of the operational bandwidth.

Alternatively, in distributing the frequency tones of the RU, processor 712 may distribute the frequency tones of the RU over an entirety of an operational bandwidth. In such cases, in communicating, processor 712 may communicate using the distributed-tone RU over the entirety of the operational bandwidth while another STA communicates over a portion but not the entirety of the operational bandwidth.

In some implementations, in distributing the frequency tones of the RU, processor 712 may distribute the frequency tones of the RU over a first frequency subblock. In such cases, in communicating, processor 712 may communicate using the distributed-tone RU over the first frequency subblock and a duplicate of the distributed-tone over a second frequency subblock different from the first frequency segment. In some implementations, each of the first frequency subblock and second frequency subblock may include a 20 MHz, 40 MHz or 80 MHz frequency subblock.

Illustrative Processes

Figure 8:
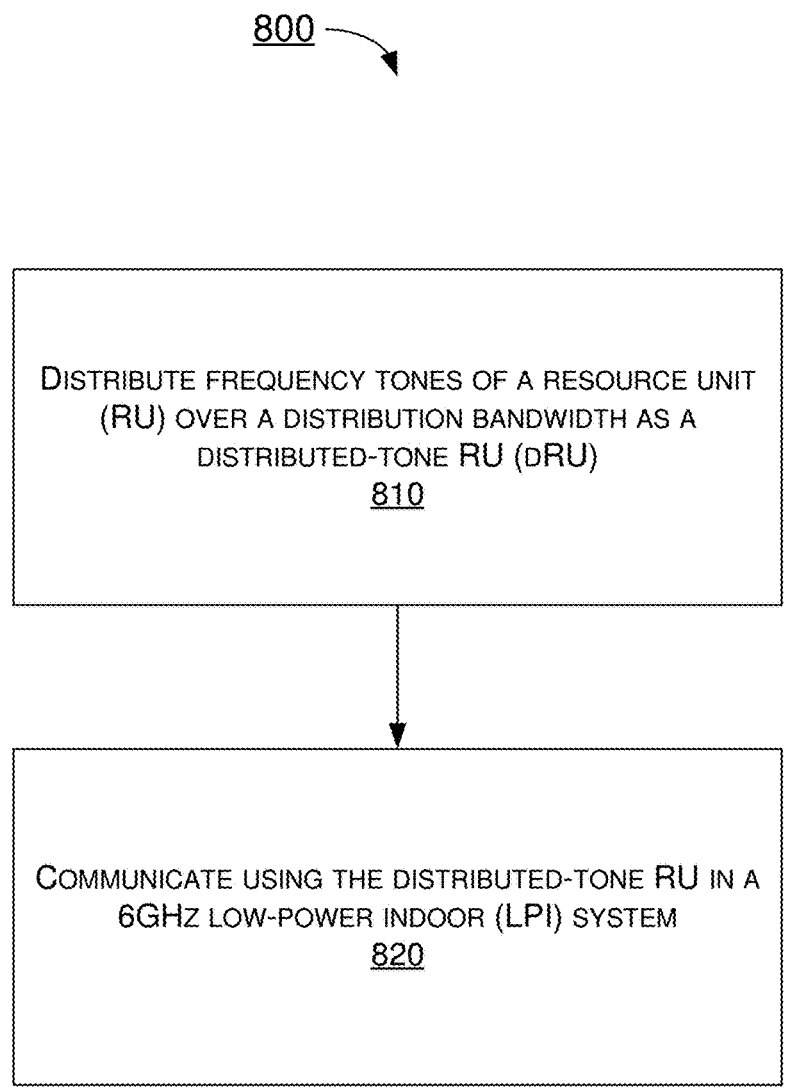
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to distributed-tone RU operation in 6 GHz LPI systems in accordance with the present disclosure. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 710 and apparatus 720 as well as any variations thereof. Solely for illustrative purposes and without limiting the scope, process 800 is described below in the context of apparatus 710 as communication entity 110 (e.g., a transmitting device whether a STA or an AP) and apparatus 720 as communication entity 120 (e.g., a receiving device whether a STA or an AP) of a wireless network such as a WLAN in accordance with one or more of IEEE 802.11 standards. Process 800 may begin at block 810.

At 810, process 800 may involve processor 712 of apparatus 710 distributing frequency tones of a RU over a distribution bandwidth as a dRU. Process 800 may proceed from 810 to 820.

At 820, process 800 may involve processor 712 communicating, via transceiver 716, with apparatus 720 using the dRU in a 6 GHz LPI system.

In some implementations, in distributing the frequency tones of the RU, process 800 may involve processor 712 distributing the frequency tones of the RU over an entirety of the distribution bandwidth. In some implementations, the distribution bandwidth may include a 20 MHz, 40 MHz or 80 MHz bandwidth. Alternatively, or additionally, the distribution bandwidth may include a bandwidth up to 80 MHz, 160 MHz or 320 MHz.

In some implementations, in distributing the frequency tones of the RU, process 800 may involve processor 712 distributing the frequency tones of the RU per frequency subblock. In some implementations, the frequency subblock may include a 20 MHz, 40 MHz or 80 MHz frequency subblock. Moreover, the distributed-tone RU may not cross a boundary between two adjacent frequency subblocks.

In some implementations, in distributing the frequency tones of the RU, process 800 may involve processor 712 distributing the frequency tones of the RU such that the distributed-tone RU is over a first frequency subblock. In such cases, in communicating, process 800 may involve processor 712 communicating using both the distributed-tone RU over the first frequency subblock and a localized RU over a second frequency subblock different from the first frequency segment. In some implementations, each of the first frequency subblock and the second frequency subblock may include an 80 MHz frequency subblock. Alternatively, or additionally, in communicating, process 800 may involve processor 712 communicating in an operational bandwidth of 160 MHz or 320 MHz.

In some implementation, dRU may be operated in a scenario in which one frequency subblock (e.g., 20 MHz) within an 80 MHz bandwidth is punctured and dRUs are distributed on other non-punctured frequency subblocks. The non-punctured frequency subblocks may include 20 MHz and 40 MHz frequency subblocks within the 80 MHz distribution bandwidth or an 80 MHz frequency subblock.

In some implementations, in distributing the frequency tones of the RU, process 800 may involve processor 712 distributing the frequency tones of the RU over a portion but not an entirety of an operational bandwidth. In such cases, in communicating, process 800 may involve processor 712 communicating using the distributed-tone RU over the portion of the operational bandwidth while another STA communicates over the entirety of the operational bandwidth.

Alternatively, in distributing the frequency tones of the RU, process 800 may involve processor 712 distributing the frequency tones of the RU over an entirety of an operational bandwidth. In such cases, in communicating, process 800 may involve processor 712 communicating using the distributed-tone RU over the entirety of the operational bandwidth while another STA communicates over a portion but not the entirety of the operational bandwidth.

In some implementations, in distributing the frequency tones of the RU, process 800 may involve processor 712 distributing the frequency tones of the RU over a first frequency subblock. In such cases, in communicating, process 800 may involve processor 712 communicating using the distributed-tone RU over the first frequency subblock and a duplicate of the distributed-tone over a second frequency subblock different from the first frequency subblock. In some implementations, each of the first frequency subblock and second frequency subblock may include a 20 MHz, 40 MHz or 80 MHz frequency subblock.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    distributing frequency tones of a resource unit (RU) over a distribution bandwidth as a distributed-tone RU (dRU); and
    communicating using the distributed-tone RU in a 6 GHz low-power indoor (LPI) system,
    wherein the distributing of the frequency tones of the RU comprises distributing the frequency tones of the RU wherein the distributed-tone RU is over a first frequency subblock but not a second frequency subblock, and
    wherein the communicating using the distributed-tone RU comprises communicating with a hybrid of the distributed-tone RU in the first frequency subblock and a regular RU in the second frequency subblock.

2. The method of claim 1, wherein the distributing of the frequency tones of the RU comprises distributing the frequency tones of the RU per frequency subblock or segment over at least the first frequency subblock.

3. The method of claim 2, wherein the frequency subblock comprises a 20 MHz, 40 MHz or 80 MHz frequency subblock or segment.

4. The method of claim 2, wherein one frequency subblock within an 80 MHz bandwidth is punctured, and wherein the distributing of the frequency tones of the RU comprises distributing the frequency tones of the RU over non-punctured 20 MHz and 40 MHz subblocks within the 80 MHz distribution bandwidth or an 80 MHz frequency subblock.

5. The method of claim 2, wherein the distributed-tone RU does not cross a boundary between two adjacent frequency subblocks.

6. The method of claim 1, wherein each of the first frequency subblock and the second frequency segment comprises an 80 MHz frequency subblock.

7. The method of claim 1, wherein the communicating comprises communicating in an operational bandwidth of 160 MHz or 320 MHz.

8. The method of claim 1, wherein the distributing of the frequency tones of the RU comprises distributing the frequency tones of the RU over a portion but not an entirety of an operational bandwidth, and wherein the communicating comprises communicating using the distributed-tone RU over the portion of the operational bandwidth while another station (STA) communicates over the entirety of the operational bandwidth.

9. The method of claim 1, wherein the communicating comprises communicating using the distributed-tone RU over the first frequency subblock and a duplicate of the distributed-tone over a third frequency subblock different from the first frequency subblock.

10. The method of claim 9, wherein each of the first frequency subblock and third frequency subblock comprises a 20 MHz, 40 MHz or 80 MHz frequency subblock.

11. An apparatus, comprising:
    a transceiver configured to communicate wirelessly; and
    a processor coupled to the transceiver and configured to perform operations comprising:
    distributing frequency tones of a resource unit (RU) over a distribution bandwidth as a distributed-tone RU (dRU); and
    communicating, via the transceiver, using the distributed-tone RU in a 6 GHz low-power indoor (LPI) system,
    wherein the distributing of the frequency tones of the RU comprises distributing the frequency tones of the RU wherein the distributed-tone RU is over a first frequency subblock but not a second frequency subblock, and
    wherein the communicating using the distributed-tone RU comprises communicating with a hybrid of the distributed-tone RU in the first frequency subblock and a regular RU in the second frequency subblock.

12. The apparatus of claim 11, wherein, in distributing the frequency tones of the RU, the processor is configured to distribute the frequency tones of the RU per frequency subblock over at least the first frequency subblock, wherein the frequency subblock comprises a 20 MHz, 40 MHz or 80 MHz frequency subblock, and wherein the distributed-tone RU does not cross a boundary between two adjacent frequency subblocks.

13. The apparatus of claim 11, wherein each of the first frequency subblock and the second frequency subblock comprises an 80 MHz frequency subblock, and wherein the communicating comprises communicating in an operational bandwidth of 160 MHz or 320 MHz.

* * * * *